United States Patent
Magno, Jr.

(10) Patent No.: US 9,700,827 B2
(45) Date of Patent: Jul. 11, 2017

(54) DRAIN ADAPTOR

(71) Applicant: Thomas & Betts International, Inc., Wilmington, DE (US)

(72) Inventor: Joey D. Magno, Jr., Cordova, TN (US)

(73) Assignee: Thomas & Betts International LLC, Wilmington, DE (US)

(*) Notice: Subject to any disclaimer, the term of this patent is extended or adjusted under 35 U.S.C. 154(b) by 183 days.

(21) Appl. No.: 13/776,820

(22) Filed: Feb. 26, 2013

(65) Prior Publication Data

US 2013/0298509 A1 Nov. 14, 2013

Related U.S. Application Data

(60) Provisional application No. 61/645,657, filed on May 11, 2012.

(51) Int. Cl.
| | |
|---|---|
| *B01D 36/00* | (2006.01) |
| *F01M 11/04* | (2006.01) |
| *B01D 49/00* | (2006.01) |
| *B01D 35/16* | (2006.01) |
| *F16N 31/00* | (2006.01) |

(52) U.S. Cl.
CPC .......... *B01D 49/00* (2013.01); *B01D 35/16* (2013.01); *B01D 36/006* (2013.01); *F01M 11/0408* (2013.01); *F01M 11/0458* (2013.01); *F16N 31/00* (2013.01); *Y10T 137/86332* (2015.04)

(58) Field of Classification Search
CPC ...... B01D 49/00; B01D 35/006; B01D 35/16; B67D 7/0288; F01M 11/04; F01M 11/0408; F01M 2011/0416; F01M 2011/0425; F01M 11/0458; F16N 31/00; F16N 31/002; F16N 31/004; F16N 31/006; F16N 2031/008; F16L 55/07; F16C 33/6685; Y10T 137/86332
USPC ........ 137/588, 594, 177, 154, 587; 222/108, 222/481.5, 478, 484; 184/1.5, 106; 220/571, 573
See application file for complete search history.

(56) References Cited

U.S. PATENT DOCUMENTS

| | | | | |
|---|---|---|---|---|
| 86,350 | A * | 2/1869 | Barton | 285/124.1 |
| 2,089,851 | A * | 8/1937 | McIntosh | 62/205 |
| 2,139,476 | A * | 12/1938 | Townsend | 137/261 |
| 2,188,802 | A * | 1/1940 | Beckett | 222/420 |
| 2,197,352 | A * | 4/1940 | Terkel | 222/488 |
| 2,500,199 | A * | 3/1950 | Nesset | 604/407 |
| 2,707,967 | A * | 5/1955 | Adams | 137/212 |
| 2,841,313 | A * | 7/1958 | Beall, Jr. | 222/479 |
| 3,207,190 | A * | 9/1965 | Silbereis et al. | 141/198 |

(Continued)

*Primary Examiner* — Kevin Murphy
*Assistant Examiner* — David Colon Morales
(74) *Attorney, Agent, or Firm* — Taft Stettinius & Hollister LLP

(57) ABSTRACT

A drain adaptor comprising a stem and drain body. The stem comprises a breather opening defined by a surface of the stem and a drain opening defined by a surface of the stem. The drain body comprises another breather opening defined by a surface of the drain body and another drain opening defined by a surface of the drain body, wherein the stem extends from the drain body, and wherein a breather passageway extends from the breather opening of the stem to the other breather opening of the drain body, and wherein a drain passageway extends from the drain opening of the stem to the other drain opening of the drain body.

20 Claims, 12 Drawing Sheets

(56) References Cited

U.S. PATENT DOCUMENTS

| | | | | |
|---|---|---|---|---|
| 3,540,402 A * | 11/1970 | Kocher | | 141/198 |
| 3,655,102 A * | 4/1972 | Moran | | 222/484 |
| 3,806,085 A * | 4/1974 | Codo | | 251/144 |
| 4,298,182 A * | 11/1981 | Balch | | 251/251 |
| 4,336,473 A | 6/1982 | Wetters et al. | | |
| 4,440,193 A * | 4/1984 | Matheson | | 137/558 |
| 4,611,627 A * | 9/1986 | Eidsvoog et al. | | 137/588 |
| 4,699,298 A * | 10/1987 | Grant et al. | | 222/400.7 |
| 4,756,349 A * | 7/1988 | Atkins | | 141/383 |
| 4,846,223 A * | 7/1989 | Humbert, Jr. | | 137/625.19 |
| 4,893,651 A * | 1/1990 | Herman et al. | | 137/588 |
| 4,903,723 A | 2/1990 | Sublett | | |
| 4,945,270 A | 7/1990 | Okamoto | | |
| 5,077,503 A | 12/1991 | Tamura et al. | | |
| 5,144,978 A * | 9/1992 | Brown et al. | | 137/588 |
| 5,268,606 A | 12/1993 | Adam et al. | | |
| 5,368,181 A * | 11/1994 | Myers | | 220/303 |
| 5,443,138 A * | 8/1995 | Bedi et al. | | 184/1.5 |
| 5,547,565 A * | 8/1996 | Biere et al. | | 210/86 |
| 5,579,815 A * | 12/1996 | Labonte | | 141/384 |
| 5,606,989 A * | 3/1997 | Roll et al. | | 137/203 |
| 5,778,928 A * | 7/1998 | Boland et al. | | 137/588 |
| 5,929,544 A | 7/1999 | Maekawa et al. | | |
| 6,113,072 A * | 9/2000 | Wickett | | 251/351 |
| 6,258,269 B1 * | 7/2001 | Knight | | 210/248 |
| 6,293,304 B1 * | 9/2001 | Broberg | | 137/588 |
| 6,322,326 B1 | 11/2001 | Davis et al. | | |
| 6,470,910 B2 * | 10/2002 | Blackbourn et al. | | 137/588 |
| 6,550,492 B2 * | 4/2003 | Shaw et al. | | 137/318 |
| 6,571,562 B2 | 6/2003 | Wilcox | | |
| 6,609,699 B2 * | 8/2003 | Chen | | 251/144 |
| 6,720,693 B2 | 4/2004 | Bailey et al. | | |
| 6,724,111 B2 | 4/2004 | Marioni | | |
| 7,042,124 B2 | 5/2006 | Puterbaugh et al. | | |
| 7,489,253 B2 | 2/2009 | Murphy | | |
| 7,837,945 B2 * | 11/2010 | Kitazawa | | 422/537 |
| 7,909,053 B2 | 3/2011 | Elliott | | |
| 8,013,749 B2 | 9/2011 | Murphy | | |
| 8,049,385 B2 | 11/2011 | Vadillo et al. | | |
| 8,128,438 B2 | 3/2012 | Bernard et al. | | |
| 8,839,630 B2 | 9/2014 | Nepsha et al. | | |
| 2008/0099080 A1 * | 5/2008 | Saini et al. | | 137/454.5 |
| 2010/0154437 A1 * | 6/2010 | Nepsha | | F24F 1/02 62/3.4 |
| 2010/0258201 A1 | 10/2010 | Platusich et al. | | |
| 2011/0209776 A1 | 9/2011 | Parks et al. | | |

\* cited by examiner

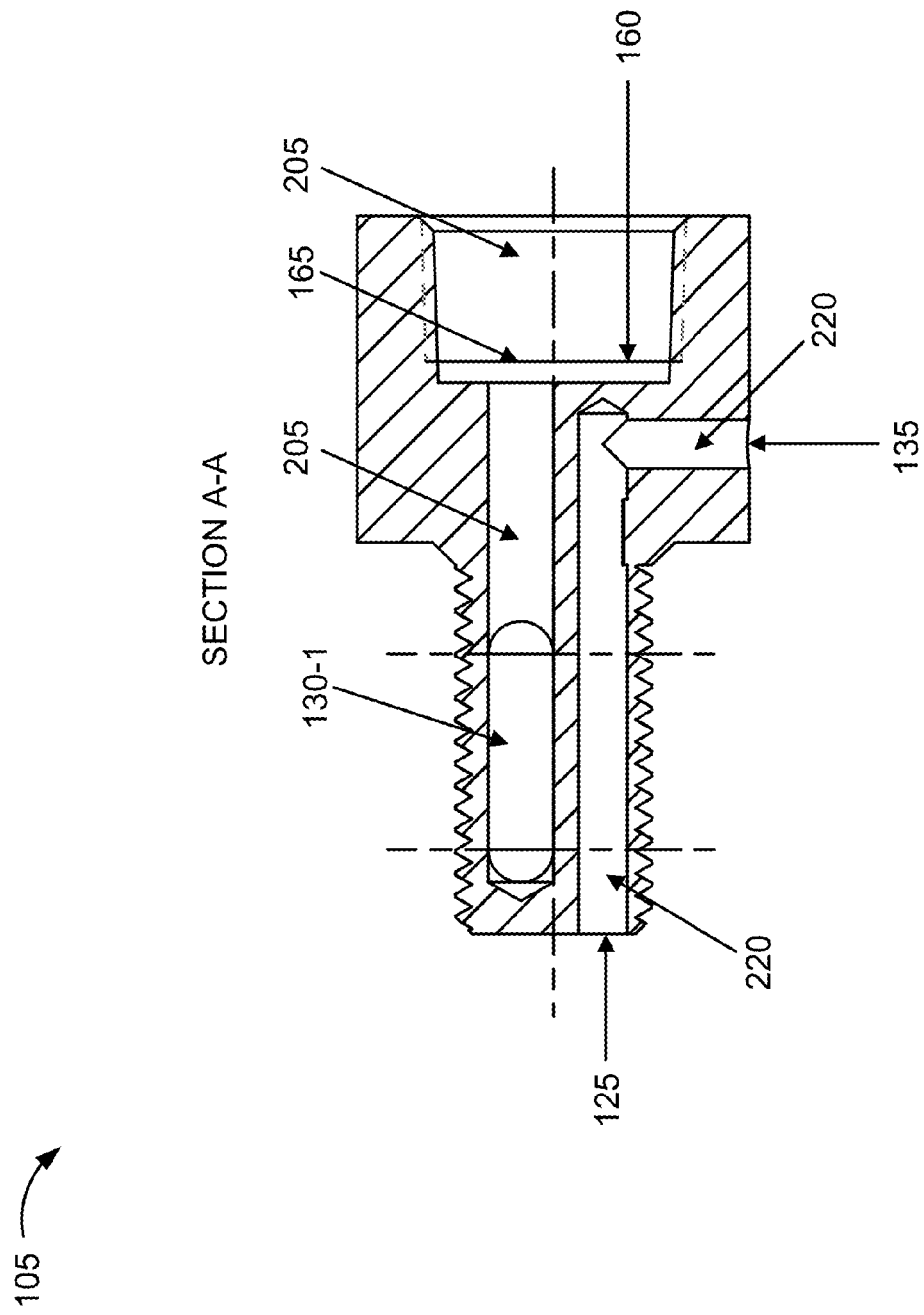

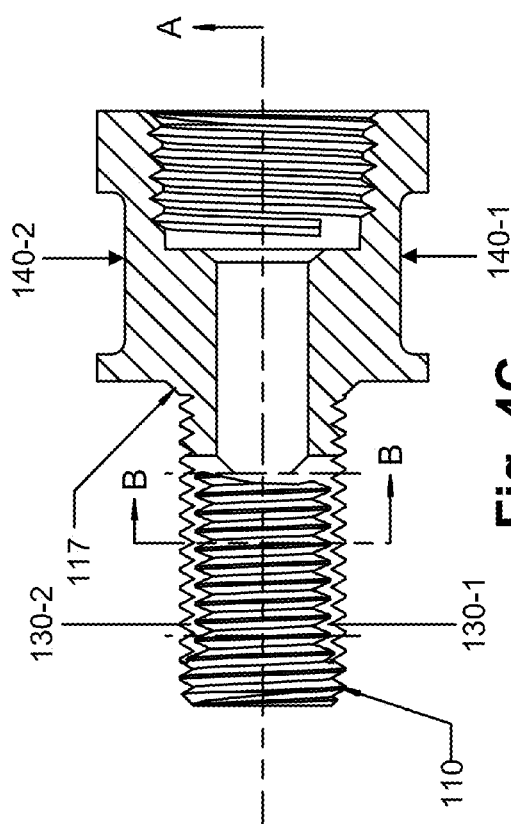
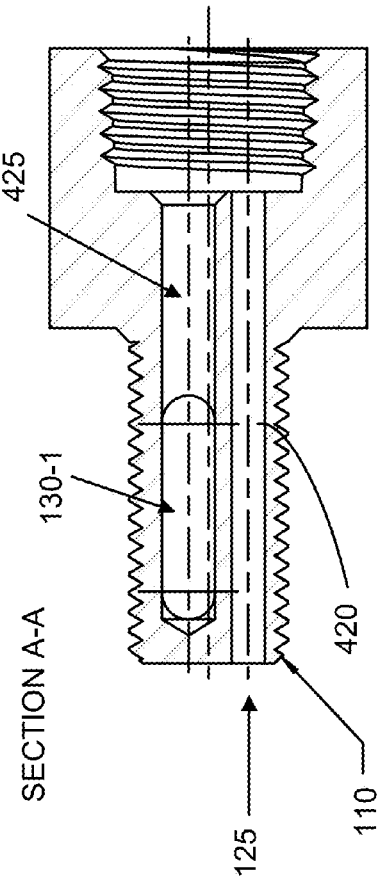
Fig. 4C
Fig. 4D
SECTION A-A

DRAIN ADAPTOR

CROSS-REFERENCE TO RELATED APPLICATION

This application claims priority under 35 U.S.C. §119, based on U.S. Provisional Patent Application No. 61/645,657, filed on May 11, 2012, the disclosure of which is hereby incorporated by reference herein.

BACKGROUND

Various types of enclosures that are exposed to different types of environments can result in water, condensation, etc., accumulating within these enclosures. For example, junction boxes, motor enclosures, or other types of enclosures used in various industries, such as food, material processing, etc., or in residential settings may accumulate moisture, etc. Moisture, liquid, etc., that exists within an enclosure can be harmful to the component(s) encased by the enclosure.

BRIEF DESCRIPTION OF THE DRAWINGS

FIG. 2C is a diagram illustrating another cross-sectional view of the drain adaptor;

FIG. 4C is a diagram illustrating a side view of the drain adaptor; and

FIGS. 4D and 4E are diagrams illustrating cross-sectional views of the drain adaptor.

DETAILED DESCRIPTION OF PREFERRED EMBODIMENTS

Figure 1A:
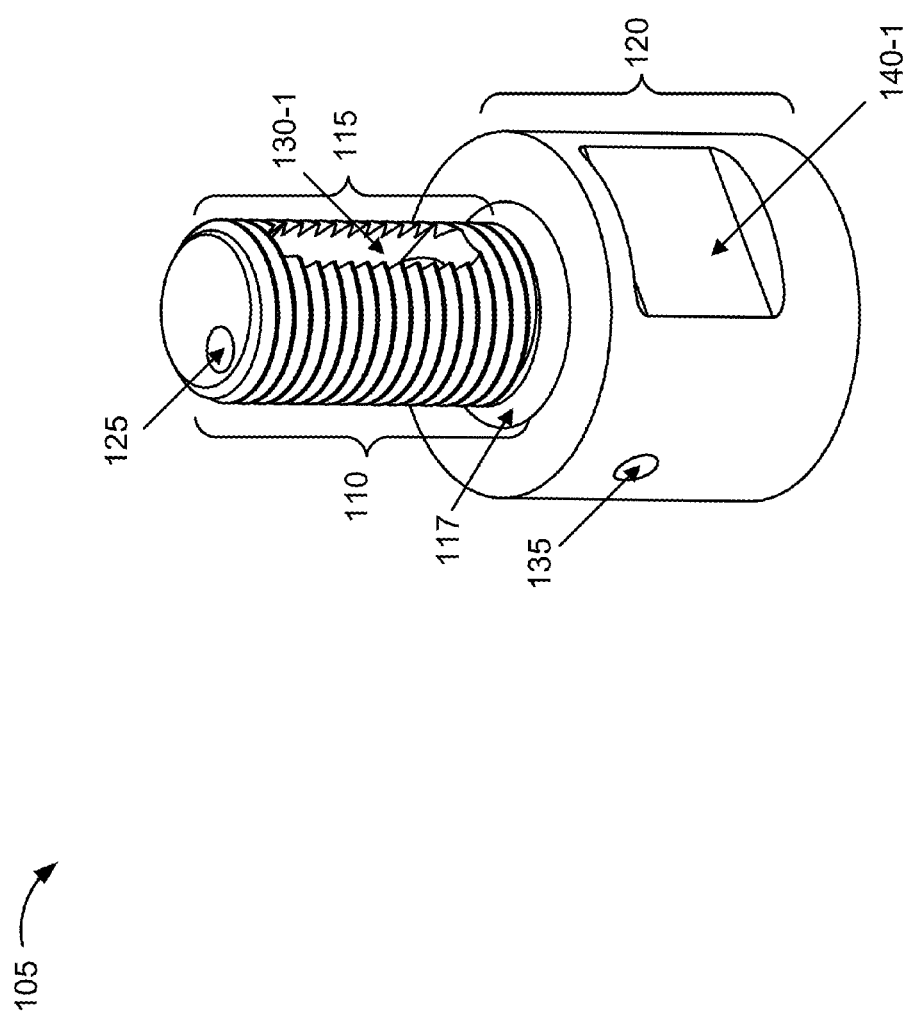
FIG. 1A is a diagram illustrating an isometric view of an exemplary embodiment of a drain adaptor.

The following detailed description refers to the accompanying drawings. The same reference numbers in different drawings may identify the same or similar elements.

According to an exemplary embodiment, a drain adaptor includes a cylindrical stem (or shaft) and a drain body. According to an exemplary embodiment, the cylindrical stem includes male threads. For example, a nut or other threaded fastener may receive the male threads of the cylindrical stem to allow the drain adaptor to affix to an enclosure. According to another exemplary embodiment, the cylindrical stem does not include male threads.

According to an exemplary embodiment, the cylindrical stem includes a breather passageway. For example, the breather passageway allows air to pass between an inside of an enclosure and an outside of the enclosure. According to an exemplary embodiment, a top surface of the cylindrical stem defines a breather opening of the breather passageway. According to an exemplary embodiment, the breather passageway extends from the top surface of the cylindrical stem to a surface of the drain body. For example, According to an exemplary implementation, the breather passageway extends from the top surface of the cylindrical stem to a side surface of the drain body. According to another exemplary implementation, the breather passageway extends from the top surface of the cylindrical stem to a bottom surface of the drain body.

According to an exemplary embodiment, the cylindrical stem includes a drain passageway. According to an exemplary embodiment, a threaded surface of the cylindrical stem defines dual drain openings of the drain passageway. The drain passageway allows, for example, water or other liquid to drain via the dual drain openings. For example, when the drain adaptor is attached to an enclosure, the dual drain openings provide an opening for water or other liquid situated in the enclosure to drain from the enclosure to the drain passageway.

According to an exemplary embodiment, the drain body includes a female-threaded, annular cavity. For example, a value or other threaded fixture may be attached to the drain body of the drain adaptor. According to an exemplary embodiment, the drain passageway extends from the drain openings of the cylindrical stem to a bottom surface of the drain body that defines an opening of the female-threaded, annular cavity. According to another exemplary embodiment, the annular cavity does not include female threads. According to such an embodiment, a conduit or other non-threaded fixture may be attached to the drain body of the drain adaptor.

According to an exemplary embodiment, the drain body includes the breather passageway. According to an exemplary embodiment, the drain body includes a breather opening defined by a side surface of the drain body. According to another embodiment, the drain body includes a breather opening defined by a bottom surface of the drain body. According to an exemplary embodiment, the drain body includes the drain passageway.

Figure 1B:
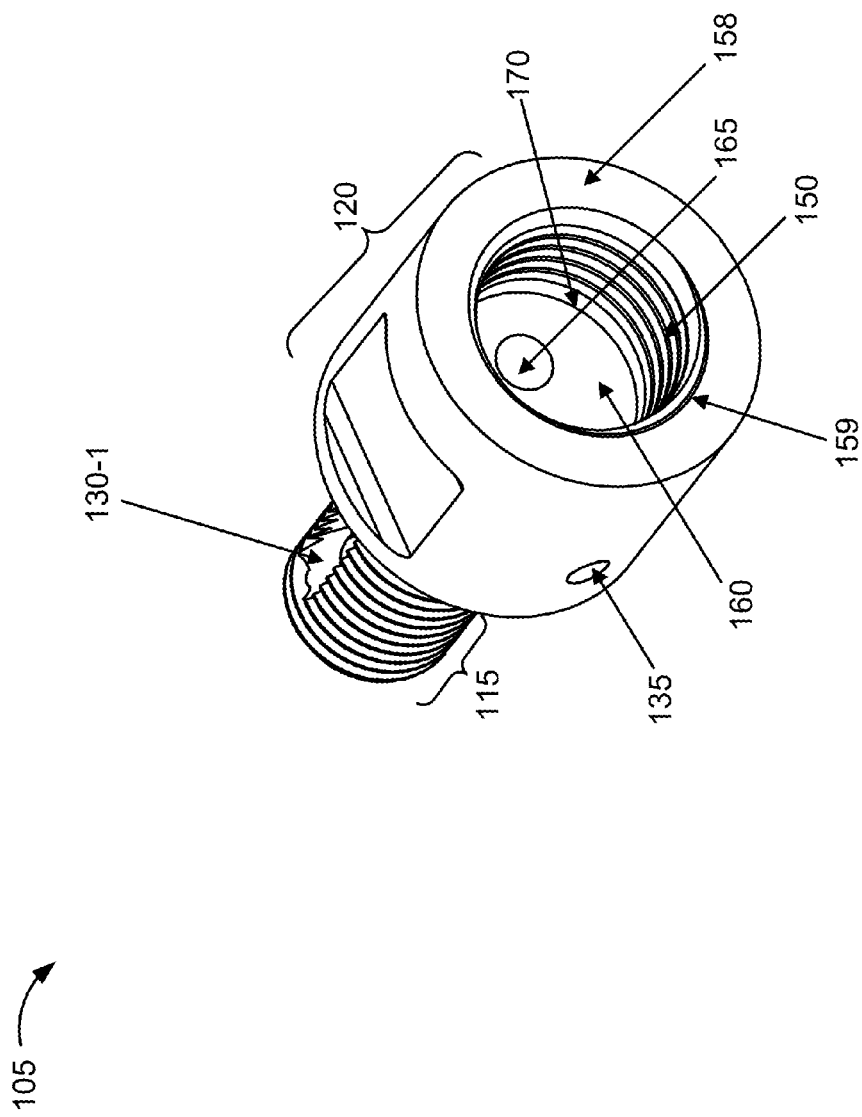
FIG. 1B is a diagram illustrating another isometric view of an exemplary embodiment of the drain adaptor.
Figure 2A:
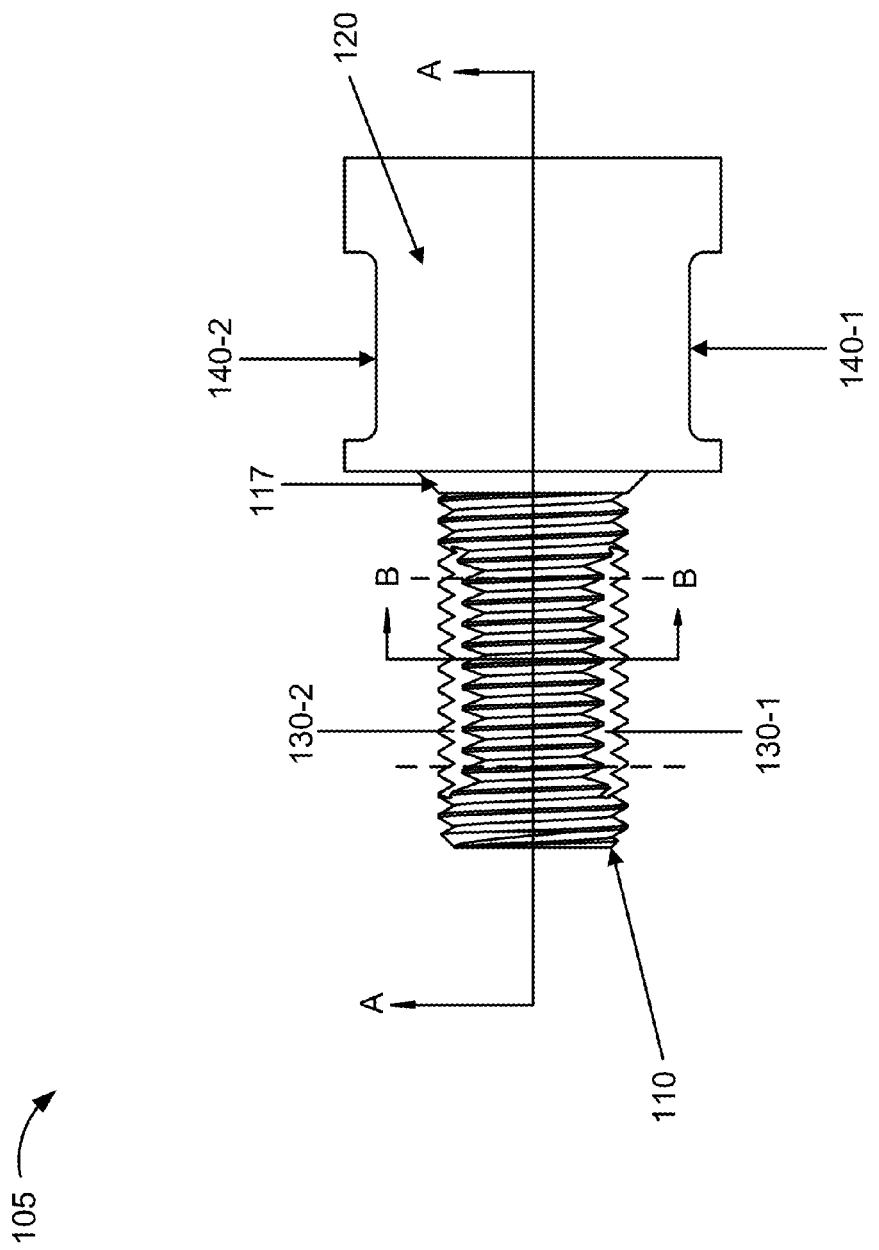
FIG. 2A is a diagram illustrating a side view of the drain adaptor.

FIGS. 1A and 1B are diagrams illustrating isometric views of an exemplary embodiment of a drain adaptor 105. Referring to FIG. 1A, as illustrated, drain adaptor 105 includes a cylindrical stem 110 and a drain body 120. Cylindrical stem 110 includes a threaded portion 115 and a base portion 117, a breather opening 125 and a drain opening 130-1. Although not illustrated in FIG. 1A, cylindrical stem 110 includes a drain opening 130-2, as illustrated in FIG. 2A. Referring back to FIG. 1A, drain body 120 includes a breather opening 135 and an indentation 140-1. Although not illustrated in FIG. 1A, drain body 120 includes an indentation 140-2, as illustrated in FIG. 2A.

Drain adaptor 105 may be made from various materials, such as, for example, metal (e.g., stainless steel, aluminum, etc.) or a non-metallic material (e.g., plastic, a composite, etc.), depending on the application (e.g., food-grade, pharmaceutical, etc.) of drain adaptor 105.

Referring to FIG. 1A, cylindrical stem 110 has a tubular shape that extends substantially perpendicular from drain body 120. Threaded portion 115 extends from a top surface of cylindrical stem 110 to base portion 117. Base portion 117 extends from a top surface of drain body 120 to threaded portion 115.

The top surface of cylindrical stem 110 defines breather opening 125. As illustrated and described further below, a breather passageway extends from breather opening 125 of cylindrical stem 110 to breather opening 135 of drain body 120. According to an exemplary implementation, breather opening 125 is located proximate to an edge of the top surface of cylindrical stem 110.

Drain opening 130-1 and drain opening 130-2 (also referred to collectively as drain openings 130 or individually as drain opening 130) are defined by a side surface of cylindrical stem 110. According to an exemplary implementation, drain openings 130 extend a substantial length of threaded portion 115.

Drain body 120 has a tubular shape that includes indentations 140-1 and 140-2 (also referred to collectively as indentations 140 and individually as indentation 140). Indentations 140 are depressions in the side surface of drain body 120 and are contoured for a tool (e.g., a wrench) or fingers/hand of an installer. According to other embodiments, drain body 120 may not include indentations 140. Breather opening 135 is defined by the side surface of drain body 120 and is vertically aligned with breather opening 125.

Referring to FIG. 1B, drain body 120 includes a female threaded surface 150 that extends from a bottom surface 158 of drain body 120 to an inner surface 160. Inner surface 160 defines a drain opening 165 of the drain passageway. Additionally, inner surface 160 and female threaded surface 150 define an annular cavity 170.

FIG. 2A is a diagram illustrating a side view of drain adaptor 105. As previously described, according to an exemplary embodiment, drain adaptor 105 includes drain openings 130 and indentations 140. As further illustrated in FIG. 2A, cross-sections A-A and B-B are indicated and described in FIGS. 2B and 2C.

Figure 2B:
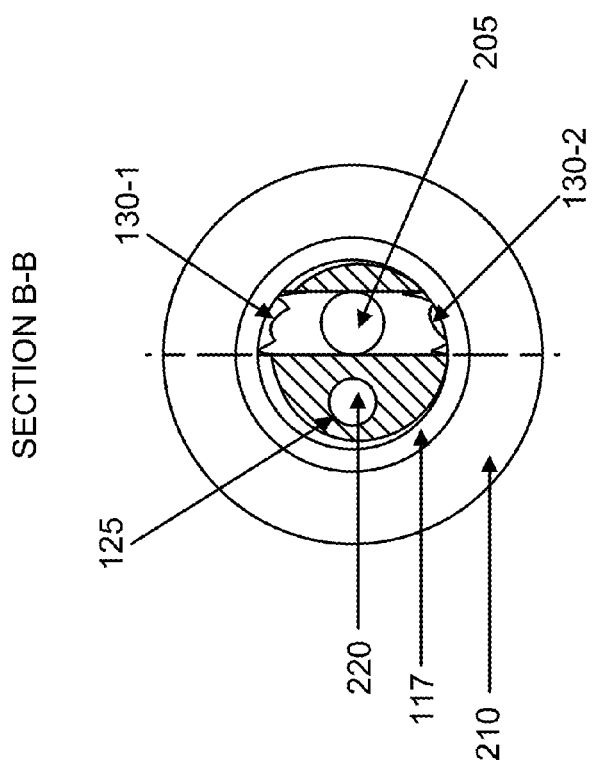
FIG. 2B is a diagram illustrating a cross-sectional view of the drain adaptor.

FIG. 2B is a diagram illustrating a cross-sectional view of drain adaptor 105. FIG. 2C is a diagram illustrating another cross-sectional view of drain adaptor 105. As illustrated in FIGS. 2B and 2C, drain openings 130 provide access to a drain passageway 205. As further illustrated in FIGS. 2B and 2C, breather opening 125 provides access to a breather passageway 220. Referring to FIG. 2C, according to an exemplary implementation, breather passageway 220 is formed as an L-shaped path from breather opening 125 to breather opening 135.

Figure 3A:
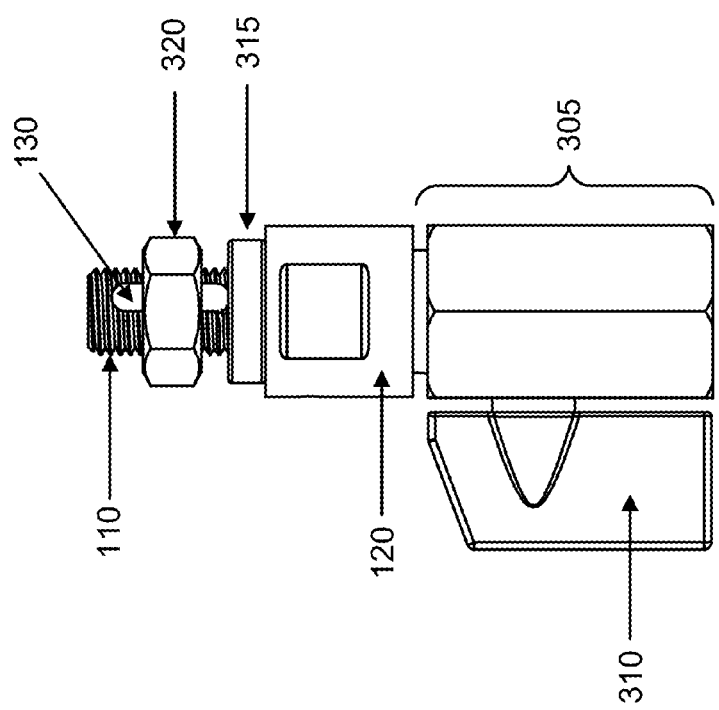
FIG. 3A is a diagram illustrating a side view of the drain adaptor with installment fixtures.

FIG. 3A is a diagram illustrating a side view of drain adaptor 105 with installment fixtures. As illustrated, a value 305 with a handle 310 is connected to drain adaptor 105. According to an exemplary implementation, value 305 may be a ball value for (manually) controlling the flow or release of water or liquid accumulating within an enclosure. According to another exemplary implementation, a pilot valve or other automated valve may be attached to drain adaptor 105. According to yet another implementation, drain adaptor 105 may attach to a conduit or a pipe to allow water or a liquid to flow. According to such an implementation, the threaded portion of drain body 120, as previously illustrated in FIG. 1B, may be omitted.

As further illustrated in FIG. 3A, a gasket 315 may be used to seal an enclosure with drain adaptor 105. Additionally, a nut 320 may be used to attach drain adaptor 105 to an enclosure. According to another implementation, another type of fixture may be used, such as, a retaining ring, to attach drain adaptor 105 to the enclosure. According to such an implementation, cylindrical stem 110 may not include male threads.

Figure 3B:
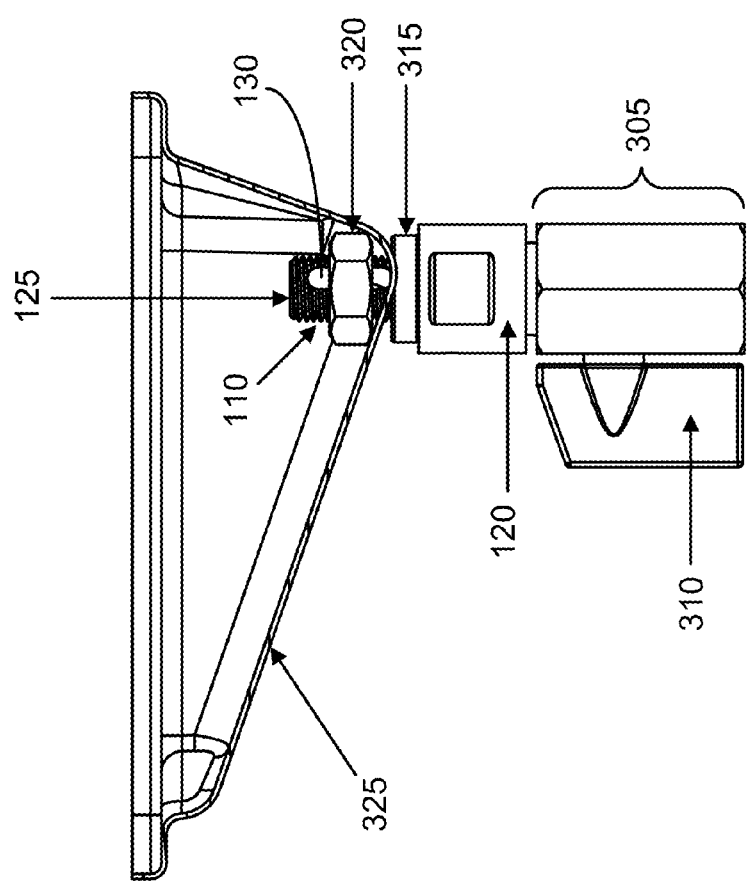
FIG. 3B is a diagram illustrating a side view of the drain adaptor attached to an enclosure.

FIG. 3B is a diagram illustrating a side view drain adaptor 105 attached to an enclosure. As illustrated, drain adaptor 105 is attached to a portion of an enclosure 325. In this example, enclosure 325 may be a bottom piece of an enclosure (e.g., a cover) for housing a motor. Gasket 315 provides a seal between drain adaptor 105 and enclosure 325. Also, nut 320 secures drain adaptor 105 to enclosure 325.

Figure 3C:
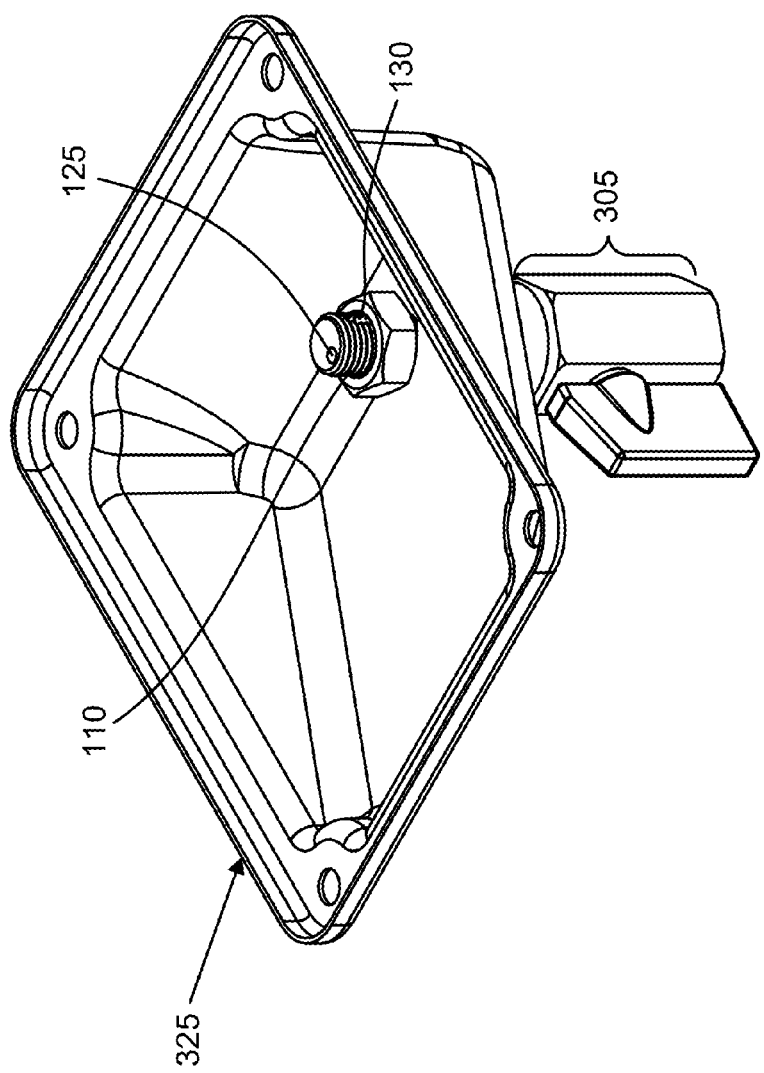
FIG. 3C is a diagram illustrating an isometric top view of the drain adaptor attached to the enclosure.
Figure 3D:
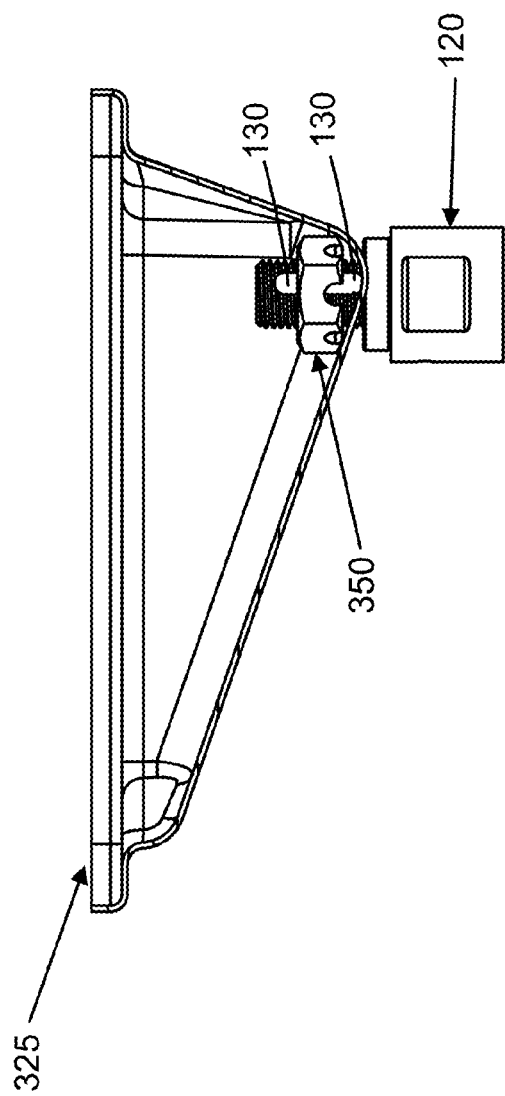
FIG. 3D is a diagram illustrating a side view of the drain adaptor attached to the enclosure.

According to this example, drain opening 130 is exposed above and beneath nut 320 to allow water to drain from enclosure 325. Additionally, breather opening 125 provides a passageway to breather opening 135 (not illustrated). FIG. 3C is a diagram illustrating an isometric top view of the drain adaptor attached to enclosure 325. According to other examples, a castle head nut 350 may be used to further expose drain openings 130, as illustrated in FIG. 3D. According to yet other examples, if drain adaptor 105 is attached to an enclosure 325 that has a relatively flat, horizontal surface, in contrast to the U-shaped bottom surface of enclosure 325 where drain adaptor 105 is attached, castle head nut 350 may expose more of drain openings 130 than nut 320.

Figure 4B:
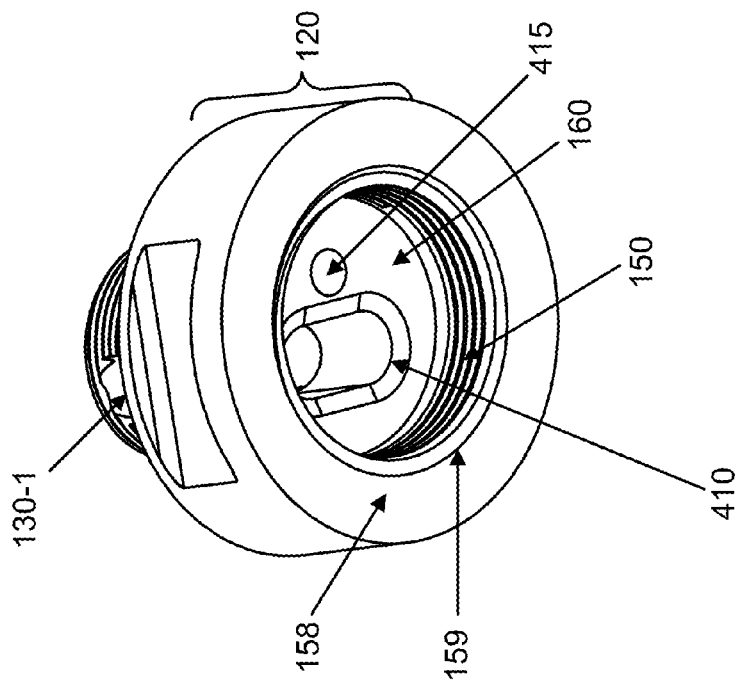
FIGS. 4A and 4B are diagrams illustrating isometric views of another exemplary embodiment of a drain adaptor.
Figure 4A:
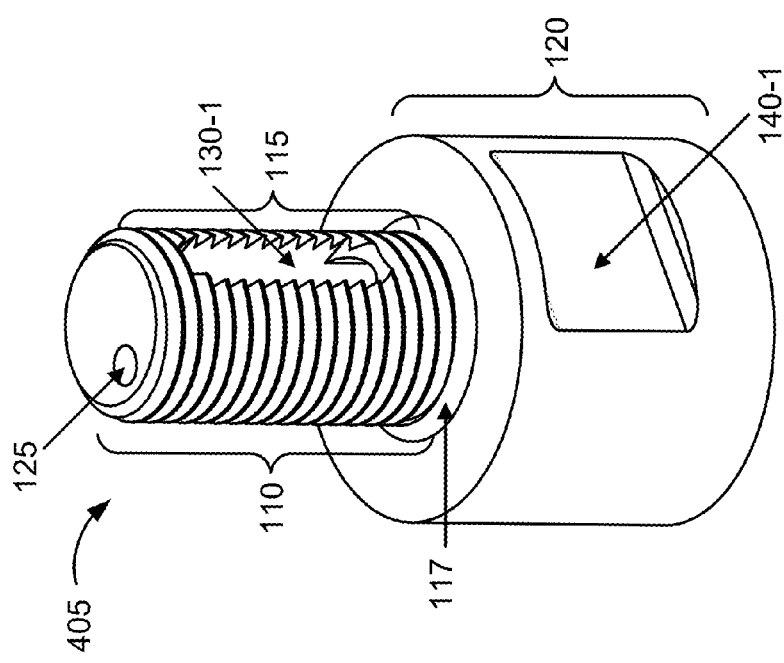
Figure 4E:
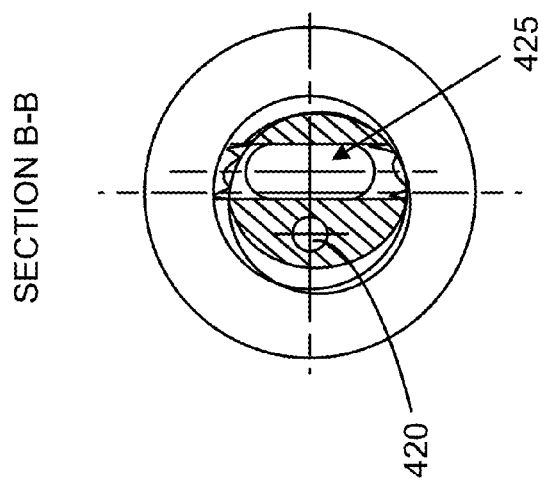

FIG. 4A is a diagram illustrating an isometric view of another exemplary embodiment of a drain adaptor 405. As illustrated, in contrast to drain adaptor 105, drain adaptor 405 does not include breather opening 135. FIG. 4C is a diagram illustrating a side view of drain adaptor 405. FIGS. 4D and 4E are diagrams illustrating cross-sectional views of drain adaptor 405. Referring to FIG. 4D, in contrast to drain adaptor 105 and breather passageway 220 (see FIG. 2C), a breather passageway 420 extends from breather opening 125 to inner surface 160. As further illustrated, a drain passageway 425 extends from drain openings 130 to inner surface 160. Breather passageway 420 and drain passageway 425 extend parallel to each other. As illustrated in FIG. 4E, according to an exemplary implementation, drain passageway 425 has a substantially oval shape. FIG. 4B is a diagram illustrating an isometric, bottom-side view of drain adaptor 405. As illustrated, inner surface 160 defines a breather opening 410 that leads to drain passageway 425. Additionally, inner surface 160 defines a drain opening 415 that leads to breather passageway 420. Inner surface 160 is substantially perpendicular to shaft 110.

In contrast to a conventional approach in which an installer may drill a hole and solder a conduit to an enclosure for drainage purposes, and drill another hole and solder another conduit to the enclosure for maintaining equal pressure, the drain adaptor described herein provides, among other things, an integrated breather and drainage system that can be easily installed without drilling multiple holes into an enclosure and multiple instances of soldering.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

Spatially relative terms, such as "top," "side," etc., may be used herein for ease of description to describe one element's or feature's relationship to another element or feature as illustrated in the figures. The spatially relative terms are intended to encompass different orientations of the element. For example, if the element in the figure is turned over, an element described as "below" or "beneath" another element or another feature would then be oriented "above" the other element or the other feature.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s).

The foregoing description of embodiments provides illustration, but is not intended to be exhaustive or to limit the embodiments to the precise form disclosed. Accordingly, modifications to the embodiments described herein may be possible. Thus, although the invention has been described in detail above, it is expressly understood that it will be apparent to persons skilled in the relevant art that the invention may be modified without departing from the spirit of the invention. Various changes of form, design, number of, or arrangement may be made to the invention without departing from the spirit and scope of the invention. Therefore, the above-mentioned description is to be considered exemplary, rather than limiting, and the true scope of the invention is that defined in the following claims.

What is claimed is:

1. A drain adaptor comprising:
   a shaft comprising:
      a breather opening defined by a surface of the shaft; and
      a drain opening defined by another surface of the shaft; and
   a drain body comprising:
      an annular cavity that is defined by a surface perpendicular to the shaft and another surface that includes female threads, wherein the shaft extends from the drain body, a breather passageway extends from the breather opening of the shaft to another breather opening defined by the surface of the annular cavity, a drain passageway extends from the drain opening of the shaft to another drain opening defined by the surface of the annular cavity, and wherein the surface of the shaft that defines the breather opening is parallel to the surface perpendicular to the shaft.

2. The drain adaptor of claim 1, wherein the breather passageway and the drain passageway extend parallel to each other.

3. The drain adaptor of claim 1, wherein the other surface of the shaft includes male threads.

4. The drain adaptor of claim 1, wherein the shaft includes a base portion that extends from a male threaded portion of the shaft to the drain body.

5. The drain adaptor of claim 1, wherein the breather opening is perpendicular to the drain opening.

6. The drain adaptor of claim 1, wherein the other drain opening is larger than the other breather opening, and wherein the drain passageway allows liquid to drain from the drain opening to the other drain opening.

7. The drain adaptor of claim 1, wherein the breather opening is off-center relative to a center point of the surface of the shaft.

8. The drain adaptor of claim 1, wherein a surface of the drain body includes indentations.

9. A drain adaptor comprising:
   a shaft comprising:
      a breather opening defined by a surface of the shaft; and
      drain openings defined by another surface of the shaft, wherein the other surface includes threads; and
   a drain body comprising:
      an annular cavity that is defined by a surface perpendicular to the shaft and another surface that includes female threads, the another surface extends between a bottom of the drain body and the surface perpendicular to the shaft, wherein the shaft extends from the drain body, a breather passageway extends from the breather opening of the shaft to another breather opening in the surface perpendicular of the shaft, a drain passageway extends from the drain opening of the shaft to another drain opening defined by the surface of the annular cavity, and wherein the surface of the shaft that defines the breather opening is parallel to the surface perpendicular to the shaft, and wherein the drain passageway does not converge with the breather passageway.

10. The drain adaptor of claim 9, wherein the shaft includes a base portion, wherein the base portion extends from a surface of the drain body to the other surface that includes threads.

11. The drain adaptor of claim 9, wherein a first drain opening of the drain openings is situated on an opposing side of the surface of the shaft relative to a second drain opening of the drain openings.

12. The drain adaptor of claim 9, wherein the breather opening is perpendicular to the drain opening, and wherein the drain passageway allows liquid to drain from the drain opening to the other drain opening.

13. The drain adaptor of claim 9, wherein the shaft includes a base portion that extends from a male threaded portion of the shaft to the drain body.

14. The drain adaptor of claim 9, wherein a surface of the drain body includes indentations.

15. The drain adaptor of claim 9, wherein the other breather opening is defined by the surface of the annular cavity, and wherein an entire length of the breather passageway extends parallel to the drain passageway.

16. The drain adaptor of claim 9, wherein the surface of the shaft that defines the breather opening and the surface of the annular cavity are located at opposite ends of the drain adaptor.

17. A drain adaptor comprising:
   a stem comprising:
      a breather opening defined by a surface of the stem; and
      a drain opening defined by another surface of the stem; and
   a drain body comprising:
      another breather opening defined by a surface of the drain body that is parallel to the surface of the stem; and
      another drain opening defined by the surface of the drain body, wherein the stem extends from the drain body, a breather passageway extends from the breather opening of the stem to the other breather opening of the drain body, a drain passageway extends from the drain opening of the stem to the other drain opening of the drain body, and wherein the surface of the stem that defines the breather opening is parallel to the surface of the drain body that defines the other drain opening, wherein the other surface of the stem that defines the drain opening includes male threads, and wherein the drain body comprises an annular cavity that is defined by the surface of the drain body, and wherein the drain passageway does not converge with the breather passageway.

18. The drain adaptor of claim 17, wherein a surface of the drain body includes indentations.

19. The drain adaptor of claim 17, wherein the breather passageway allows air to pass between the breather opening and the other breather opening.

20. The drain adaptor of claim 17, wherein the stem includes a base portion and a threaded portion, wherein the base portion extends from a surface of the drain body to the threaded portion, and wherein the drain passageway allows liquid to drain from the drain opening to the other drain opening.

<p style="text-align:center">* * * * *</p>